(12) United States Patent
Medasani et al.

(10) Patent No.: US 9,875,427 B2
(45) Date of Patent: Jan. 23, 2018

(54) METHOD FOR OBJECT LOCALIZATION AND POSE ESTIMATION FOR AN OBJECT OF INTEREST

(71) Applicant: GM GLOBAL TECHNOLOGY OPERATIONS LLC, Detroit, MI (US)

(72) Inventors: Swarup Medasani, Thousand Oaks, CA (US); Jason Meltzer, Los Angeles, CA (US); Jiejun Xu, Chino, CA (US); Zhichao Chen, Woodland Hills, CA (US); Rashmi N. Sundareswara, Los Angeles, CA (US); David W. Payton, Calabasas, CA (US); Ryan M. Uhlenbrock, Los Angeles, CA (US); Leandro G. Barajas, Harvest, AL (US); Kyungnam Kim, Oak Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 14/811,062

(22) Filed: Jul. 28, 2015

(65) Prior Publication Data
US 2017/0032220 A1    Feb. 2, 2017

(51) Int. Cl.
*G06K 9/00* (2006.01)
*G06K 9/62* (2006.01)
(Continued)

(52) U.S. Cl.
CPC .......... *G06K 9/6218* (2013.01); *G01B 11/002* (2013.01); *G06K 9/00214* (2013.01);
(Continued)

(58) Field of Classification Search
CPC ...... G06K 9/4614; G06K 9/4671; G06K 9/56; G06K 9/00; G06K 9/46; G06K 9/00228;
(Continued)

(56) References Cited

U.S. PATENT DOCUMENTS

| 6,606,406 B1 * | 8/2003 | Zhang ............... G06K 9/00201 345/422 |
| 6,621,941 B1 * | 9/2003 | Syeda-Mahmood G06F 17/30259 382/181 |

(Continued)

OTHER PUBLICATIONS

Robert E. Schapire; "Explaining AdaBoost"; Princeton University, Dept. of Computer Science, 35 Olden Street, Princeton, NJ 08540.

*Primary Examiner* — Aklilu Woldemariam
(74) *Attorney, Agent, or Firm* — Quinn IP Law (57) ABSTRACT

A method for localizing and estimating a pose of a known object in a field of view of a vision system is described, and includes developing a processor-based model of the known object, capturing a bitmap image file including an image of the field of view including the known object, extracting features from the bitmap image file, matching the extracted features with features associated with the model of the known object, localizing an object in the bitmap image file based upon the extracted features, clustering the extracted features of the localized object, merging the clustered extracted features, detecting the known object in the field of view based upon a comparison of the merged clustered extracted features and the processor-based model of the known object, and estimating a pose of the detected known object in the field of view based upon the detecting of the known object.

12 Claims, 5 Drawing Sheets

(51) Int. Cl.
*G01B 11/00* (2006.01)
*G06K 9/46* (2006.01)
*G06T 3/00* (2006.01)
*G06T 7/20* (2017.01)
*G06T 7/73* (2017.01)

(52) U.S. Cl.
CPC ......... *G06K 9/4671* (2013.01); *G06K 9/6203* (2013.01); *G06K 9/6215* (2013.01); *G06K 9/6256* (2013.01); *G06T 3/00* (2013.01); *G06T 7/20* (2013.01); *G06T 7/74* (2017.01); *G06K 9/00* (2013.01); *G06K 2009/4666* (2013.01); *G06T 2207/10028* (2013.01); *G06T 2207/20016* (2013.01)

(58) Field of Classification Search
CPC ............. G06K 9/6256; G06K 9/00214; G06K 9/00744; G06K 9/52; G06K 9/00261; G06K 9/00342; G06K 9/00476; G06K 9/6202; G06K 9/6211; G06K 9/00201; G06K 9/4676; G06K 9/6218; G06K 9/6215; G06K 2009/4666; G06K 9/00771; G06K 9/00637; G06K 9/4642; G06K 9/6267; G06K 9/6292; G06K 9/6293; G06T 7/40; G06T 3/00; G06T 7/20; G06T 2207/10016; G06T 7/11; G06T 2207/10021; G06T 2207/20008; G06T 2207/30244; G06T 7/90; G06T 7/97; G06T 7/215; G06T 7/246; G06T 7/73; G06T 2207/10012; G06T 7/593; G06T 7/74; G06T 2207/20016; G06T 7/35; G06T 7/77; G06N 3/08; G06N 3/02; G06N 3/008; G06N 3/10; G01B 11/002; H04N 5/23219; H04N 19/137; H04N 19/597; H04N 5/23293; H04N 13/0239; G08B 13/19602; G08B 13/19606; G01C 11/02; G01C 21/32; G01C 21/3673

USPC ....... 382/103, 181, 197, 154, 201, 209, 225, 382/278
See application file for complete search history.

(56) References Cited

U.S. PATENT DOCUMENTS

| | | | | |
|---|---|---|---|---|
| 6,728,404 | B1* | 4/2004 | Ono ..................... | G06K 9/3241 382/118 |
| 7,227,893 | B1* | 6/2007 | Srinivasa ........... | G06K 9/00771 348/155 |
| 8,243,997 | B2* | 8/2012 | Davis .................. | G06K 9/0063 382/109 |
| 8,401,308 | B2* | 3/2013 | Nakamura ........... | G06K 9/4642 382/203 |
| 8,503,760 | B2* | 8/2013 | Lee ..................... | G06K 9/00201 359/627 |
| 8,705,877 | B1* | 4/2014 | Cluster .............. | G06K 9/00201 345/419 |
| 9,661,215 | B2* | 5/2017 | Sivan .................. | H04N 5/23219 |
| 2006/0098873 | A1* | 5/2006 | Hildreth ............. | G06K 9/00375 382/181 |
| 2008/0253656 | A1* | 10/2008 | Schwartzberg ...... | G06K 9/3258 382/181 |
| 2009/0190798 | A1* | 7/2009 | Lee ..................... | G06K 9/00201 382/103 |
| 2009/0238460 | A1 | 9/2009 | Funayama et al. | |
| 2012/0011142 | A1* | 1/2012 | Baheti ................. | G06K 9/4671 707/769 |
| 2012/0033852 | A1* | 2/2012 | Kennedy ............... | G06K 9/00 382/103 |
| 2012/0201469 | A1* | 8/2012 | Livet .................... | G06K 9/6202 382/201 |
| 2012/0308136 | A1* | 12/2012 | Izhikevich ......... | G06K 9/00744 382/181 |
| 2015/0116355 | A1* | 4/2015 | Hofmann .......... | G06K 9/00671 345/633 |

* cited by examiner

METHOD FOR OBJECT LOCALIZATION AND POSE ESTIMATION FOR AN OBJECT OF INTEREST

TECHNICAL FIELD

The disclosure relates to a vision system, and methods for localizing an object of interest and its pose.

BACKGROUND

Known robotic perception systems achieve desired performance and reliability by engineering specific lighting conditions, structuring viewing conditions and exploiting process configuration. They are flexible under a narrow range of conditions that work only in a subset of real-world conditions, and may breakdown with minor changes in the surrounding environment. In addition, processing speed of known systems and related techniques is not sufficient for efficient real-time processing. Turnkey commercial vision systems can be slow when introducing wider flexibility and are made to work robustly by rigorously structuring the domain. For example, processing a large field-of-view (FOV) to search for objects in unexpected orientations that occupy 5-10% of FOV may take several seconds or more. This is further compounded when searching for front/back/side views to precisely find an object location and pose. Furthermore, cost associated with structuring the surroundings for known automation solutions for robot material transfer and handling applications can be three to ten times the cost associated with the robotic device. The range of products that can be efficiently handled can be limited in known automation systems and is often restricted to just a handful of styles. Furthermore, such systems are cumbersome to retool and slow to reconfigure for a different class of products. Thus, existing automation solutions are not readily applicable in assembly operations that deal with a wide diversity of parts due to issues related to investment, operations cost, flexibility and reconfigurability.

SUMMARY

A method for localizing and estimating a pose of a known object in a field of view of a vision system is described, and includes developing a processor-based model of the known object, capturing a bitmap image file including an image of the field of view including the known object, and extracting features from the bitmap image file. The extracted features are matched with features associated with the model of the known object. An object in the bitmap image file may be localized based upon the extracted features. The extracted features of the localized object are clustered and merged. The known object in the field of view may be detected based upon a comparison of the merged clustered extracted features and the processor-based model of the known object. A pose of the detected known object in the field of view is estimated based upon the detecting of the known object.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 5-1 graphically shows a 3D image of a FOV including known objects including a switch, speaker and sensor, in accordance with the disclosure;

FIG. 5-2 graphically shows a blob that is extracted from the 3D image shown with reference to FIG. 5-1, in accordance with the disclosure;

FIG. 5-3 graphically shows the 3D image of the FOV shown with reference to FIG. 5-1 including the known objects with corresponding extracted features, in accordance with the disclosure;

DETAILED DESCRIPTION

Figure 1:
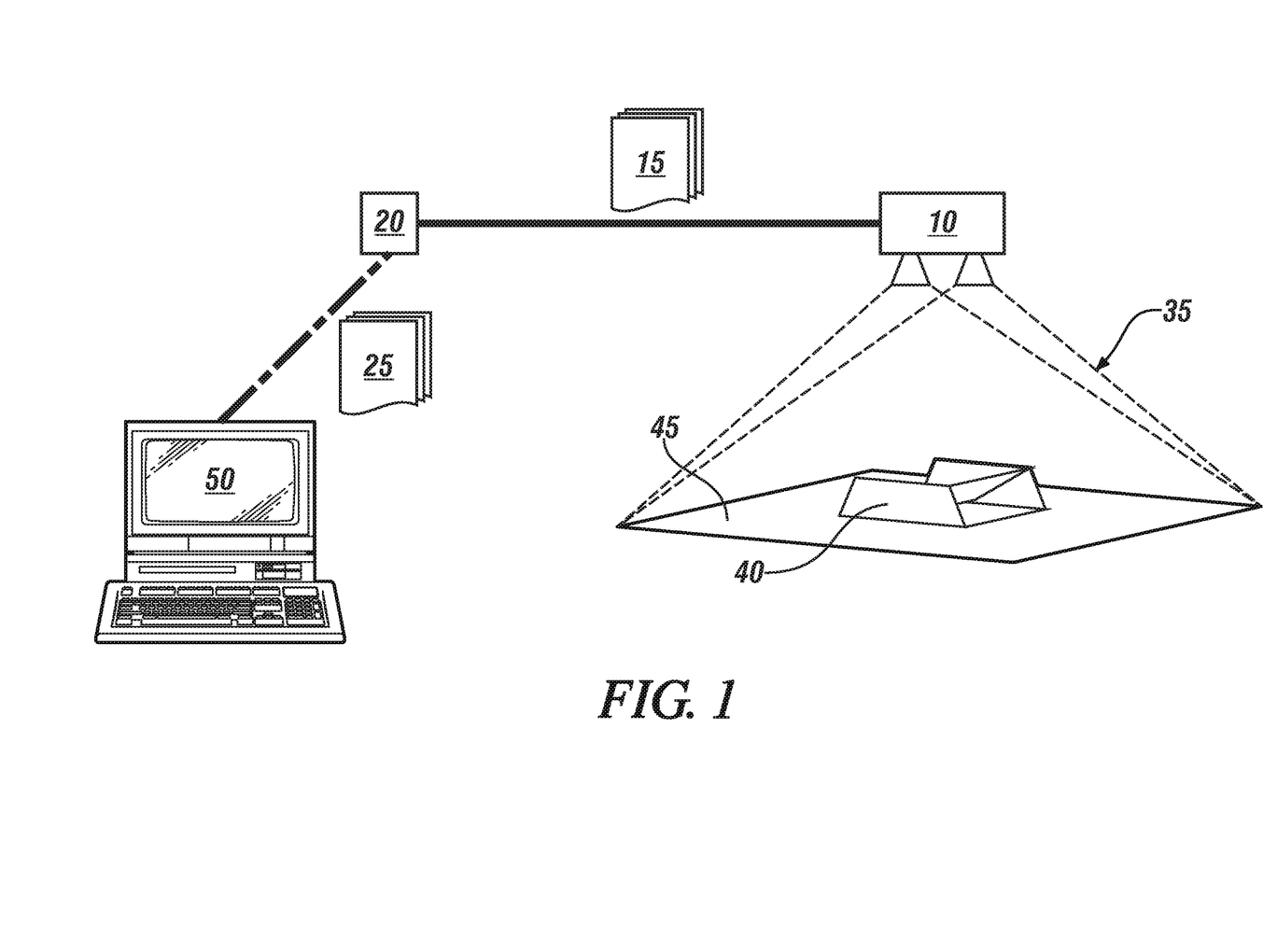
FIG. 1 schematically illustrates a vision system for capturing, processing and storing a three-dimensional (3D) image of a field of view (FOV), including a camera, a known object, and an image classifier, in accordance with the disclosure.

Referring now to the drawings, wherein the depictions are for the purpose of illustrating certain exemplary embodiments only and not for the purpose of limiting the same, FIG. 1 schematically illustrates an exemplary vision system for capturing, processing and storing an image of a field of view (FOV), including an image detector (camera) 10 signally connected to an encoder 20 signally connected to a controller 50. The camera 10 is preferably a stereo device capable of capturing a three-dimensional (3D) image. The camera 10 can be at any position and orientation relative to a known object 40 in the FOV 35, with the known object 40 oriented on a plane 45. The term "known object" as employed herein represents a structural entity having predefined physical features including by way of example spatial dimensions, materials and surface finishes indicating reflectivity, among others.

In one embodiment, the 3D image 15 captured by the camera 10 is a bitmap image file in the form of a 24-bit stereo image including RGB (red-green-blue) values and depth values that represent the FOV 35. Other embodiments of the 3D image 15 can include a 3D image depicting a black-and-white or a grayscale representation of the 3D FOV and other image representations without limitation. The camera 10 includes an image acquisition sensor that signally connects to the encoder 20 that executes digital signal processing (DSP) on the 3D image 15. The image acquisition sensor captures pixels in the FOV 35 at a predetermined resolution, and the encoder 20 generates a bitmap image file 25 of the FOV 35, e.g., an 8-bit bitmap of the pixels representing the FOV 35 at a predefined resolution. The encoder 20 generates the bitmap image file 25, which is communicated to the controller 50. The bitmap image file 25 is an encoded datafile stored in a non-transitory digital data storage medium in one embodiment. The bitmap image file 25 includes a digital representation of a 3D image that may include one or a plurality of known objects 40, and represents an original image of the FOV captured at the original resolution of the camera. The plurality of known objects 40 may all be of the same design, or may be dissimilar designs. The 3D image 15 of the known object 40 captured by the camera 10 contains sufficient information to evaluate the position of the known object 40 in relation to the camera 10. The shape of the known object 40 depends upon the relative viewing angles and distance between the camera 10 and the known object 40 after influences associated with illumination and reflectivity have been accounted for and the camera 10 has been calibrated.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables. The term 'model' refers to a processor-based or processor-executable code that simulates a physical existence or a physical process.

Figure 2:
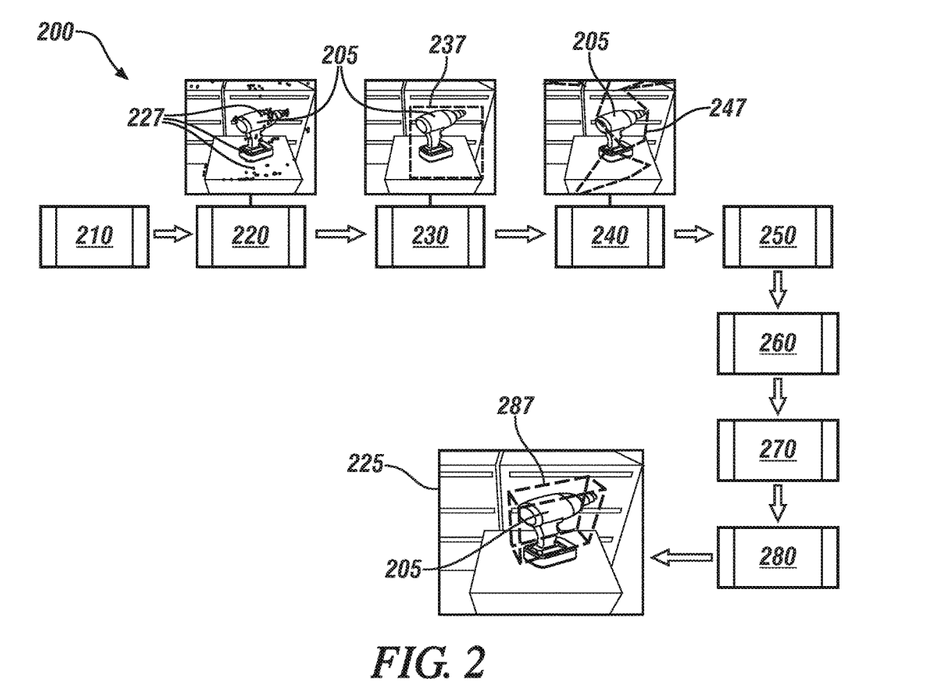
FIG. 2 schematically shows a process for localizing and estimating a pose of a known object in a field of view of an exemplary vision system, in accordance with the disclosure.

FIG. 2 schematically shows a first embodiment of a pose estimation process 200 for localizing and estimating a pose of a known object 205 in a field of view of an exemplary vision system. This may include employing the camera 10 to capture a bitmap image file 25 of a known object 40 in the FOV 35, as is described with reference to FIG. 1. One example visual depiction of a bitmap image file captured by a camera is shown, and includes an RGB-valued image 225 including a known object 205. Specific elements associated with steps of the pose estimation process 200 includes feature extraction 210, feature matching 220, rapid object localization 230, keypoint clustering 240, coarse object detection 250, cluster merging 260, fine object detection 270 and pose filtering 280 to estimate a pose of the known object 205.

The feature extraction step 210 for the known object 205 is a process to detect and describe local features in the RGB-valued image 225 including the known object 205 employing a scale-invariant feature transform (SIFT) algorithm in one embodiment. A SIFT algorithm identifies distinctive scale-invariant image features, shown as SIFT features 227, from keypoints captured in the bitmap image file of the RGB-valued image 225. Preferably, a substantial quantity of keypoints are identified, with each keypoint characterized as being readily repeated on a part-to-part basis and within the same part, e.g., the known object 205, providing a representative orientation and scale of the known object 205 that can be readily extracted and matched. SIFT processes and algorithms are known and thus not described in detail herein.

Figure 3:
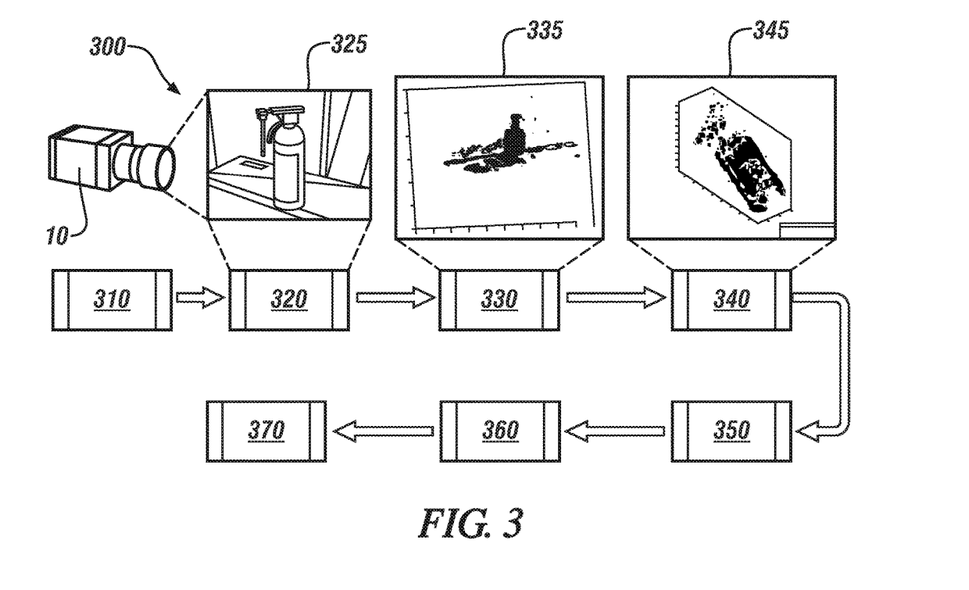
FIG. 3 shows a model building process that rapidly builds a processor-based model representing a known object using video and interframe feature tracking, in accordance with the disclosure.

The feature matching step 220 extracts the SIFT features 227 from sample images of a FOV including a work environment that can be tracked over time using a simple approximate nearest-neighbor technique. This creates a correspondence between an extracted feature and one or more extracted features in a model of the known object 205. FIG. 3 shows one process for developing a processor-based model representing a known object. A neural network or other suitable program can be employed in this capacity.

The rapid object localization step 230 uses the extracted SIFT features 227 to find one or a plurality of the known objects 205 in the FOV. This improves processing speed since subsequent steps only need to be performed in the likely regions of the FOV and not the entire FOV. The rapid object localization step 230 is an appearance-based process wherein the SIFT features 227 are detected on a test image and referenced to a previously-trained appearance model that discriminates between features that belong to the known object 205 and those that are noise belonging in the background. A digital window 237 is fit around a region of interest that can be much smaller than the size of the entire image, wherein the region of interest is identified as that portion of the RGB-valued image 225 that includes the SIFT features 227. The use of the digital window 237 limits data analysis to only that portion of the data associated with inliers in the bitmap image file of the RGB-valued image 225 that is contained within the window 237 and excludes from analysis the portion of the image data file bitmap image file of the RGB-valued image 225 that is not contained within the window 237. This action boosts the quality of the final pose estimation of the known object 205 and reduces running time by limiting the search space for feature matching and execution of a random sample consensus (RANSAC) algorithm. RANSAC is non-deterministic algorithm that produces a result within a reasonable probability that increases with iterative execution. An operating assumption is that the data consists of inliers, i.e., data whose distribution can be explained by some set of model parameters associated with the known object 205, though may be subject to noise, and outliers that are data that do not fit the model. The outliers are a result of extreme values of noise, or from erroneous measurements or from incorrect hypotheses about the interpretation of data. RANSAC also assumes that, given a small set of inliers, there exists a procedure which can estimate the parameters of a model that optimally explains or fits the data associated with the window 237. RANSAC algorithms are known and thus not described herein. The digital window 237 digitally circumscribes the data consisting of the inliers contained within the digital window 237.

The keypoint clustering step 240 captures the SIFT features 227 from the localized regions into clusters 247, which are matched to a model of the known object 205 that is stored in memory. This includes relaxation of one-to-one correspondence, allowing the clustering process to combine and identify a known object 205 that has few unambiguous appearance features. This is implemented by augmenting a list of possible matches to include all matches that lie below a similarity threshold.

The coarse object detection step 250 includes a coarse-to-fine image matching step to detect a pose of the known object 205. This includes employing the RANSAC algorithm and linear modelling (LM) to detect a coarse pose of the known object 205. The RANSAC algorithm employs an iterative method to estimate parameters of a mathematical model from a set of observed data, e.g., the clusters 247 that are output from the keypoint clustering step 240, which contains outliers.

The cluster merging step 260 includes merging multiple clusters spanning one of the known objects, since data associated with a single known object 205 may be contained in multiple clusters 247. The fine object detection step 270 includes detecting a fine object with an assumption that each of the clusters 247 contains features from a single known object 205. This can also employ the RANSAC algorithm. The pose filtering step 280 removes false detections and fine-tunes the estimated pose of the known object 205, which can be made available to a robotic arm or another device for acts of grasping, manipulation and the like. The known object 205 and the estimated pose 287 of the known object 205 are graphically depicted.

FIG. 3 shows a model building process 300 that rapidly builds a processor-based model representing a known object using video and interframe feature tracking. In such manner, an object can become a known object. The digital camera 10 captures digital images in the form of digital video of an object, such video shown as element 325, at a plurality of poses in relation to the digital camera (310), which can include a multithreading video device that captures digital images. Feature tracking is executed on the captured digital images, including employing a Lucas-Kanade (LK) method to make use of spatial intensity information to direct an image search for a pose of the object that yields a best match with the image (320). The LK method is a known differential method for optical flow estimation that estimates that displacement of a pixel in an image between two video frames is small and approximately constant for a point p under consideration. The basic optical flow equations are solved for all the pixels in that neighborhood using least-squares criteria. By combining information from several nearby pixels, the LK method resolves ambiguity in an optical flow equation and is relatively insensitive to image noise. The LK method does not provide flow information in the interior of uniform regions of the image.

Interframe feature tracking is used by known bundle adjustment routines to build a 3D point cloud associated with specific poses of the object in relation to the digital camera (310), with an example 3D point cloud shown as element 335. The LK method does not employ canonical feature descriptors. Instead, appearance descriptors of the geometric model are input in a manner that is compatible with Multiple Object Pose Estimation and Detection (MOPED) for pose estimation. MOPED is a scalable and low latency object recognition and pose estimation system. Additionally, surface normals are found to support pose optimization. To accomplish both, and to maximally automate model building, operations are executed after receiving the results of the bundle adjustment process. The process incorporates 3D points that do not have associated appearance descriptors. When using feature tracking on less distinctive objects, many points do not have unambiguous SIFT descriptors or any descriptors at all except the color of the tracked point. Such information is incorporated into the LM pose optimization by adding terms that penalize the objective function with the difference between the model-point color and the re-projection of the model-point color. In this way, even those points for which there are no image-based matches can inform the pose estimation. This includes incorporating information about model surface normal, which is necessary because without explicit matching, it must be determined if a model point is visible or if it is occluded by the object, i.e., facing the other way. This is accomplished by determining whether the surface normal for the point of interest faces the camera or faces away. The points of interest that face the camera qualify and the points of interest that face away from the camera do not qualify, providing a sufficient approximation for the task at hand. Only non-occluded points are considered in the pose optimization at any given step, since there is no data available to measure color differences of hypothesized occluded points. The model building procedure employs video tracking plus visual features to build denser models faster. These models can ultimately be built in real-time. A simple descriptor matching in pose optimization to smooth pose refinement can be added, and direct range data can be incorporated. Thus, 2D re-projection and 3D back-projection can be combined in a single optimization of a pose. Occluding boundaries can be found and employed to filter boundary-crossing descriptors, thus minimizing descriptor corruption. Such operations permit the system to identify specific features and parts that are most useful for pose estimation for a known object.

An automated process finds a geometric plane on which the known object is placed for image capture to perform model refinement (340), shown as element 345. Only points lying above this plane are considered part of the model. A follow-up manual point-removal graphic user interface (GUI) enables a user to remove remaining stray 3D points in one embodiment. Such interaction by a user with a GUI to remove remaining stray 3D points may not be required or necessary. Knowledge of the plane's normal also allows for automatic axis alignment of the model. A 3D mesh is constructed from a point cloud model generated by model refinement (350), which is a convex hull in one embodiment. This 3D mesh becomes a surface onto which new 3D features can be projected from the training images.

Appearance descriptors are associated with the geometric model (360). This includes computing SIFT features for each training image selected. For each of these SIFT features in each selected view, only those whose back-projections intersect the 3D model are selected. In one embodiment this includes finding the convex hull of the 2D model projections per view and only admitting SIFT features lying inside to enhance processing speed. Admitted SIFT features have back-projections computed, and a new 3D point is added to the model where the SIFT center intersects the meshed 3D model for the known object. A new model is output, preferably in an XML format and containing 3D features with SIFT associations derived from the original 3D model that does not have SIFT descriptors (370).

Figure 4:
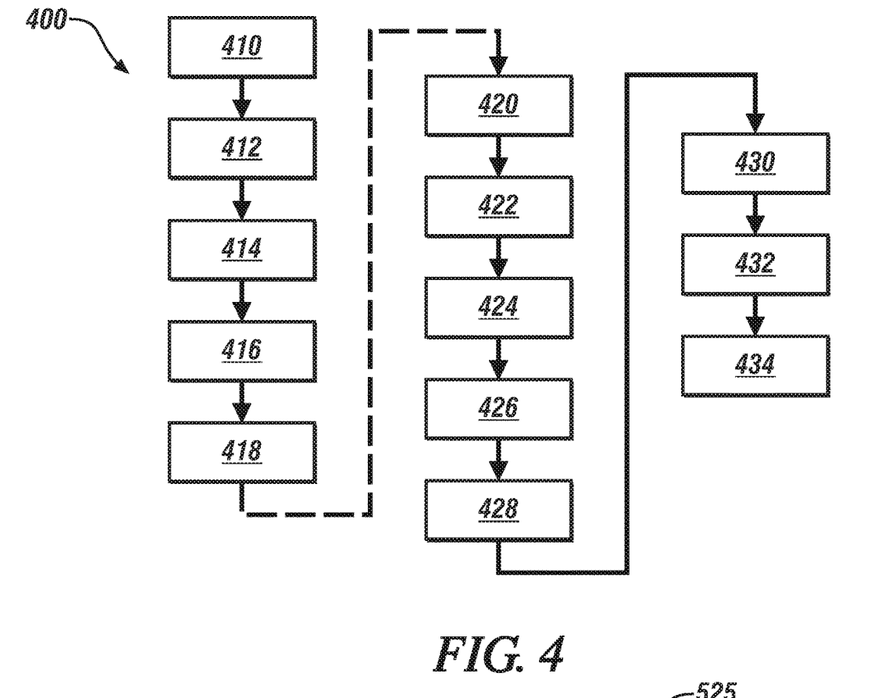
FIG. 4 schematically shows a second embodiment of a process for localizing and estimating a pose of a known object in a field of view of an exemplary vision system, in accordance with the disclosure.

FIG. 4 schematically shows a second embodiment of a process 400 for localizing and estimating a pose of a known object in a field of view of an exemplary vision system, e.g., the bitmap image file containing the 3D image 15 captured by the camera 10 in the form of a 24-bit stereo image including RGB (red-green-blue) values and depth values that represent the FOV.

The process 400 includes a training portion (Steps 410-418) and a testing portion (Steps 420, et seq.). The training portion includes employing the camera to capture 'n' quantity of training images of the known object from 'n' different viewpoints (410), with the training images converted to bitmap image files. The bitmap image files are analyzed and a main blob is extracted therefrom (412). A blob is a region of a digital image in which some properties are constant or vary within a prescribed range of values. All the points in a blob are considered to be similar to each other. Blobs may be separated and individually identified for evaluation. By way of example as part of explaining the operation of process 400, FIG. 5-1 graphically shows a 3D image 525 of a FOV including known objects including a switch 505, speaker 507 and sensor 509, FIG. 5-2 graphically shows a main blob 515 that is extracted from the 3D image 525 of the FOV including known objects 505, 507 and 509 shown in FIG. 5-1. FIG. 5-3 graphically shows the 3D image 525 of the FOV including external features for the known objects including switch 505 with corresponding extracted features 506, speaker 507 with corresponding extracted features 508 and sensor 509 with corresponding extracted features 510.

Referring again to FIG. 4, features in the form of interest points are captured from the main blob extracted from the bitmap image file (414). A local feature detector algorithm such as SIFT or SURF (Speeded Up Robust Features) can be employed. One known SURF algorithm uses an integer approximation to capture the interest points. A plurality of 3D points associated with the main blob are extracted and interpolation is employed to identify and define missing depth points (416). The interest points and the 3D points associated with the main blob are saved in a non-volatile memory device as the nth training image of the known object for the specific perspective (418). The training process is executed for each of the 'n' training images.

The test procedure operates by capturing an image and recognizing presence of an object, e.g., a known object (420). One or more object blobs, i.e., blobs corresponding to known objects are extracted from the main blob of the image (422) and interest point detectors for the object blob are extracted after removal of any outliers (424). A 3D point cloud associated with each object blob is extracted and identified as 'P1' and a 2D blob associated with the known object is extracted and identified as B2' (426). The interest point detectors are compared with all the training images for the known object determined during the training portion (428), and one of the training images and corresponding viewpoints that has a greatest quantity of interest points corresponding to the 3D point cloud associated with the object blob is identified and captured (430). The 3D point cloud associated with the object blob is identified as object blob 'P2' and saved in a non-volatile memory device, and the corresponding 2D blob is identified as 'B2' and also saved (430). An Iterative Closest Point (ICP) algorithm executes to determine a rotation and translation of the object blob from P1 to P2 (432). When the data associated with the 3D point clouds P1 and P2 is deemed too noisy, rotation and translation from B1 to B2 is determined (434). This analytical process is sufficient when all the rotation and translation between training and testing occurs in the same plane of rotation, i.e., the objects are on the same surface and the camera has not changed its location or movement.

Figure 6:
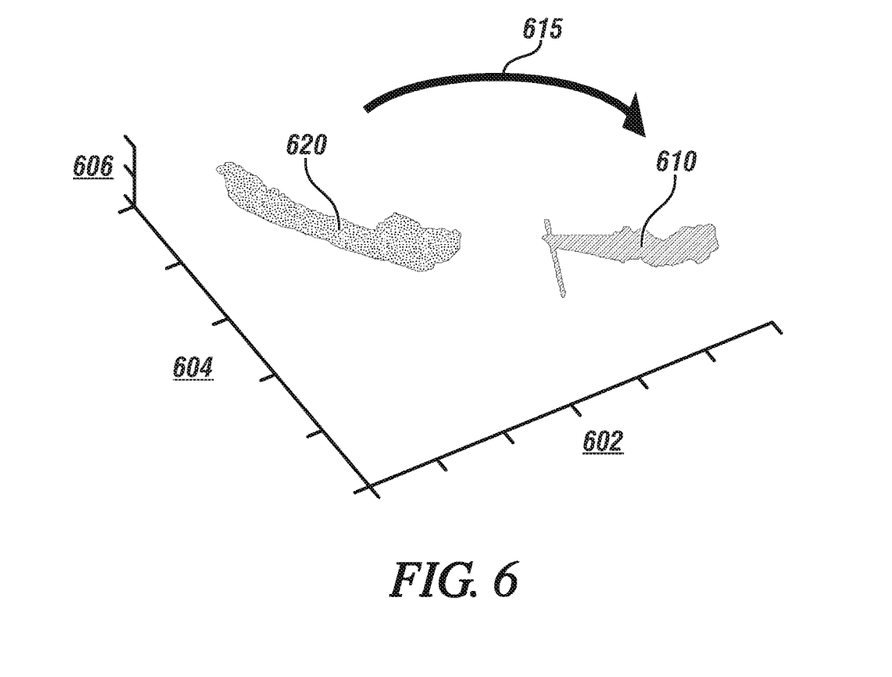
FIG. 6 graphically shows a 3D illustration of images showing 3D point clouds of the known object in context of x, y and z axes, in accordance with the disclosure.

FIG. 6 graphically shows a 3D illustration of images 610 and 620 showing 3D point clouds of the known object in context of x, y and z axes 602, 604 and 606, respectively. Image 610 is a 3D point cloud depicting the known object in a present test pose, and image 620 is a 3D point cloud depicting the known object in one of a plurality of training poses, with image 620 representing the training pose that is a closest approximation to image 610. The image 610 is shown rotated and translated (615) relative to image 620.

Figure 7:
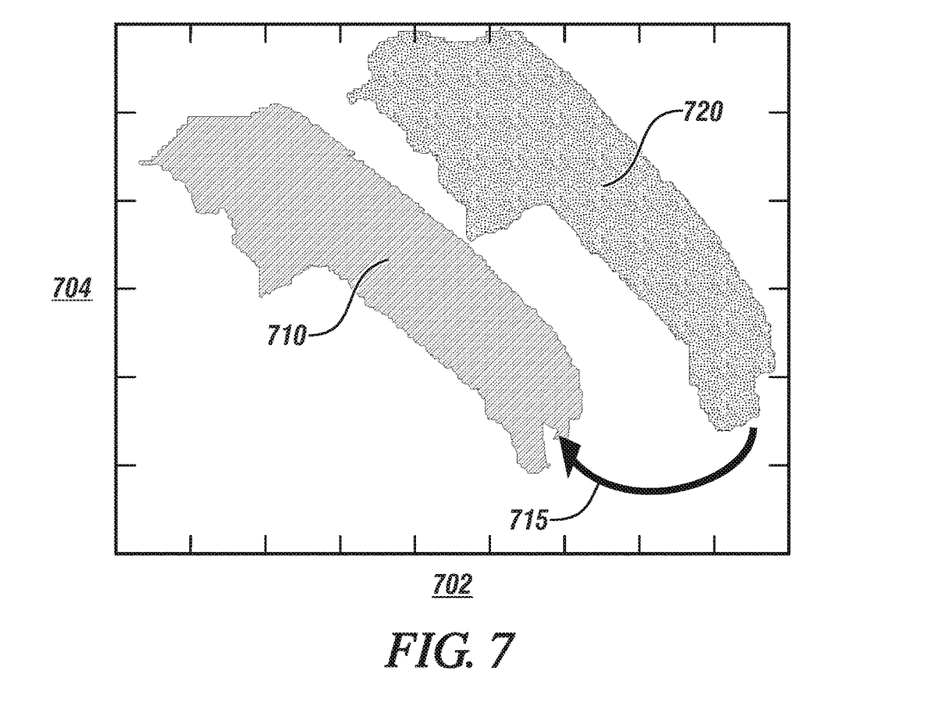
FIG. 7 graphically shows a 2D illustration of images showing 2D point clouds of the known object in context of x and y axes, in accordance with the disclosure.
Figure 51:
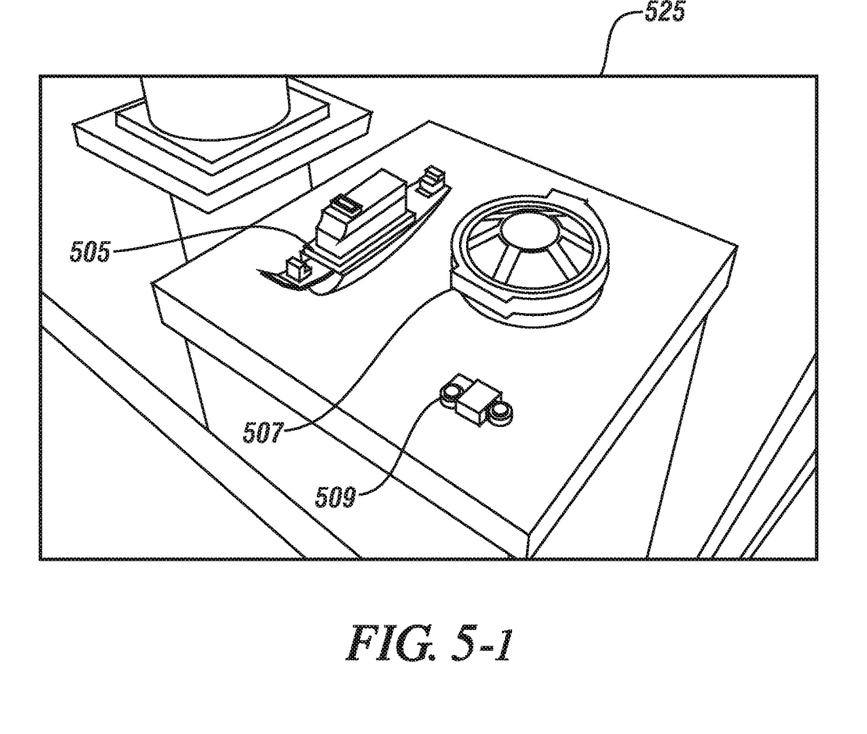
Figure 52:
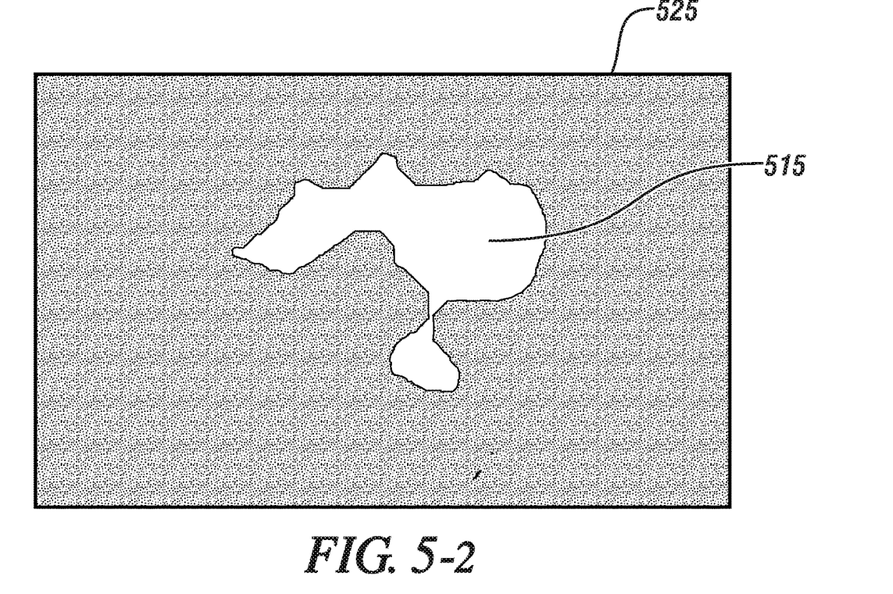
Figure 53:
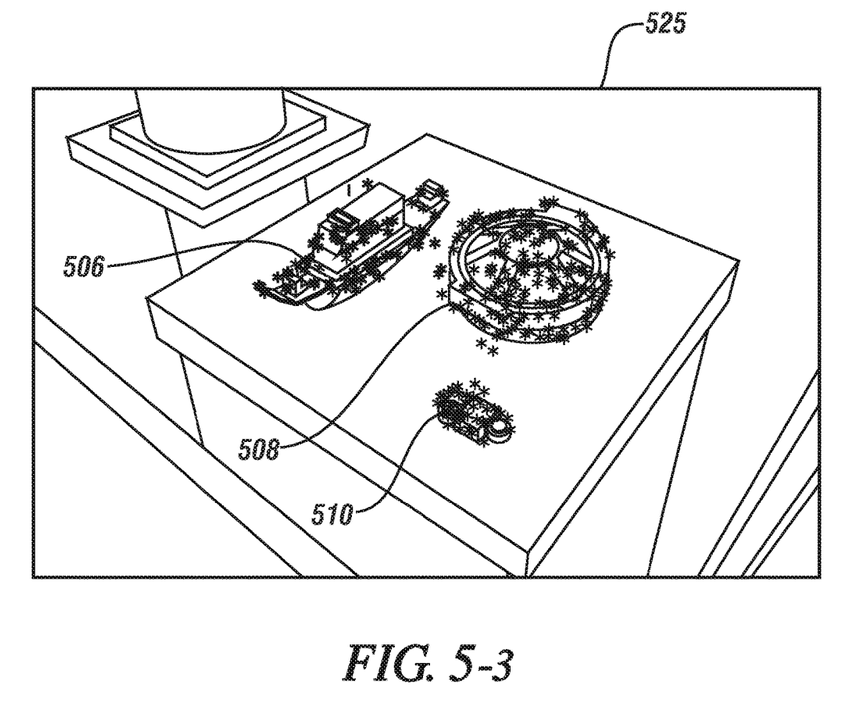

FIG. 7 graphically shows a 2D illustration of images 710 and 720 showing 2D point clouds of the known object in context of x and y axes 702 and 704, respectively. Image 710 is a 2D point cloud depicting the known object in a present test pose, and image 720 is a 2D point cloud depicting the known object in one of a plurality of training poses, with image 720 representing the training pose that is a closest approximation to image 710. The image 710 is shown rotated and translated (715) relative to image 720.

As described herein, processes and related algorithms can be developed for robust low-level visual perception by understanding how the human visual system acquires invariance to nuisance factors such as illumination, angle of view, distance, and occlusions.

A vision-based approach as described herein automatically localizes the object of interest in the FOV and estimates its pose. This capability enables a device, e.g., a robotic arm to localize objects for grasping and/or manipulation by extracting attributes about an object in context of its surroundings with flexible matching for a wide range of objects and conditions, orientations, lighting, points of view, occlusions, background and spatial awareness. The approach described herein leverages both appearance and geometry to both localize and recognize object pose and can utilize the range information from a depth sensor into the pose optimization algorithm to boost accuracy. The use of multi-sensory perception speeds up classification and searching by incorporating multi-sensory perception attention mechanisms and by developing classifier taxonomies for rapidly parsing through a wide variety of objects.

This facilitates deployment of automation systems by providing high levels of flexibility and reconfigurability. The proposed ideas allow flexibility and convertibility using minimal infrastructure with a certain degree of first generation humanoid robot automation in assembly operations such as bin-picking or material handling. It also enables robust and autonomous assembly capability, finding of parts in less structured environments, visual confirmation of tasks, and ready manipulation of complex and flexible parts. The system described herein enables a robotic arm to complement the role of humans in the assembly line and reduce worker time spent on routine, non-critical, repetitive assembly process functions that are within the near term capabilities of dexterous humanoid robots. The system described herein enables a robotic arm to handle semi-rigid, rigid, prismatic parts of a variety of shapes and forms, rapidly detect many objects, and have the ability to learn models for new objects in a semi-automated manner. This capability is necessary and critical for enabling robots that can work in tandem with humans using the same process infrastructure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for localizing and estimating a pose of a known object in a field of view of a vision system, the known object including a structural entity having pre-defined features including spatial dimensions, the method comprising:

developing a processor-based model of the known object;

capturing a bitmap image file including an image of the field of view including the known object;

extracting features from the bitmap image file;

matching the extracted features with features associated with the model of the known object;

localizing an object in the bitmap image file based upon the extracted features, including identifying features in the bitmap image file associated with features of the known object, wherein identifying the features includes fitting a digital window around a region of interest in the bitmap image file and identifying features only in a portion of the bitmap image file within the digital window, and wherein fitting the digital window includes identifying inliers in the bitmap image file including data whose distribution can be explained by some set of model parameters associated with the known object;
clustering the extracted features of the localized object;
merging the clustered extracted features;
detecting the known object in the field of view based upon a comparison of the merged clustered extracted features and the processor-based model of the known object; and
estimating a pose of the detected known object in the field of view based upon the detecting of the known object.

2. The method of claim 1, wherein extracting features from the bitmap image file includes employing a scale-invariant feature transform (SIFT) algorithm to detect distinctive image features from scale-invariant keypoints in the bitmap image file.

3. The method of claim 1, wherein extracting features from the bitmap image file comprises extracting distinctive image features from scale-invariant keypoints in the bitmap image file based upon a correspondence between the extracted feature and an extracted feature in the processor-based model of the known object.

4. The method of claim 1, wherein estimating a pose of the detected known object in the field of view based upon the detecting of the known object comprises executing a coarse-to-fine image matching step to detect a pose of the known object.

5. The method of claim 1, wherein developing a processor-based model of the known object comprises:
capturing, employing a digital camera, digital images of the known object at a plurality of poses in relation to the digital camera;
executing feature tracking on the captured digital images;
building a three-dimensional (3D) point cloud associated with the poses based upon the feature tracking;
constructing a 3D mesh from the 3D point cloud; and
associating appearance descriptors with the 3D mesh.

6. The method of claim 5, wherein capturing, employing a digital camera, digital images of the known object at a plurality of poses in relation to the digital camera comprises capturing video images of the known object at a plurality of poses; and
wherein executing feature tracking on the captured digital images comprises executing interframe feature tracking on the captured digital images.

7. A method for detecting a known object in a field of view of a vision system, the known object including a structural entity having pre-defined features including spatial dimensions, the method comprising:
developing a processor-based model of the known object;
capturing, via a single image detector, a bitmap image file including an image of the field of view including a known object;
extracting features from the bitmap image file;
matching the extracted features with features associated with the model of the known object;
localizing an object in the bitmap image file based upon the extracted features, including identifying features in the bitmap image file associated with features of the known object, wherein identifying the features includes fitting a digital window around a region of interest in the bitmap image file and identifying features only in a portion of the bitmap image file within the digital window, and wherein fitting the digital window includes identifying inliers in the bitmap image file including data whose distribution can be explained by some set of model parameters associated with the known object;
clustering the extracted features of the localized object;
merging the clustered extracted features; and
detecting the known object in the field of view based upon a comparison of the merged clustered extracted features and the processor-based model of the known object.

8. The method of claim 7, wherein extracting features from the bitmap image file includes employing a scale-invariant feature transform (SIFT) algorithm to detect distinctive image features from scale-invariant keypoints in the bitmap image file.

9. The method of claim 7, wherein extracting features from the bitmap image file comprises extracting distinctive image features from scale-invariant keypoints in the bitmap image file based upon a correspondence between the extracted feature and an extracted feature in the processor-based model of the known object.

10. The method of claim 7, wherein developing a processor-based model of the known object comprises:
capturing, employing a digital camera, digital images of the known object at a plurality of poses in relation to the digital camera;
executing feature tracking on the captured digital images;
building a three-dimensional (3D) point cloud associated with the poses based upon the feature tracking;
constructing a 3D mesh from the 3D point cloud; and
associating appearance descriptors with the 3D mesh.

11. The method of claim 10, wherein capturing, employing a digital camera, digital images of the known object at a plurality of poses in relation to the digital camera comprises capturing video images of the known object at a plurality of poses; and
wherein executing feature tracking on the captured digital images comprises executing interframe feature tracking on the captured digital images.

12. A method for determining a pose of an object of interest, comprising:
generating, by way of a digital camera, a three-dimensional (3D) digital image of a field of view;
executing object recognition in the digital image including detecting at least one recognized object;
extracting an object blob corresponding to the recognized object;
extracting a plurality of interest points from the object blob;
extracting a 3D point cloud and a 2D blob associated with the object blob;
comparing the interest points from the blob with interest points from each of a plurality of training images;
selecting one of the plurality of training images comprising the one of the training images having a greatest quantity of interest points similar to the interest points from the object blob;
saving the 3D point cloud and the 2D blob associated with the object blob;
calculating a rotation and a linear translation between the 3D point cloud associated with the object blob and the selected one of the training images employing an iterative closest point (ICP) algorithm; and
executing training to generate the plurality of training images, including:
capturing, using a digital camera, a plurality of training images of the known object at a plurality of different viewpoints;

converting each of the training images to bitmap image files;
extracting a main blob from each of the bitmap image files;
capturing features and interest points for the main blob;
extracting 3D points associated with the main blob; and
employing interpolation to identify and define missing depth points;
 wherein the training image includes the captured features and interest points for the main blob and the extracted 3D points associated with the main blob.

\* \* \* \* \*